United States Patent [19]
Kim

[11] Patent Number: 6,018,464
[45] Date of Patent: Jan. 25, 2000

[54] OPTION CARD-EQUIPPING DEVICE FOR IMPROVING ELECTROMAGNETIC SHIELDING AND A COMPUTER USING THE SAME

[75] Inventor: Joung-Ouk Kim, Suwon, Rep. of Korea

[73] Assignee: SamSung Electronics Co., Ltd., Suwon, Rep. of Korea

[21] Appl. No.: 09/027,484

[22] Filed: Feb. 20, 1998

[30] Foreign Application Priority Data

Mar. 10, 1997 [KR] Rep. of Korea ............... 97-7962

[51] Int. Cl.[7] .................... H05K 9/00; H05K 5/00
[52] U.S. Cl. ............... 361/818; 361/753; 361/796; 361/800; 361/816; 174/35 R
[58] Field of Search ..................... 361/730, 796, 361/800, 818, 752, 753, 758, 770, 784, 792, 797; 174/35 R; 206/706, 719; 211/41.17

[56] References Cited

U.S. PATENT DOCUMENTS

| | | |
|---|---|---|
| 4,744,006 | 5/1988 | Duffield . |
| 4,873,395 | 10/1989 | Mast . |
| 4,924,355 | 5/1990 | Mitchell et al. . |
| 4,942,380 | 7/1990 | Bradford et al. . |
| 4,971,563 | 11/1990 | Wells, III . |
| 5,004,867 | 4/1991 | Mast . |
| 5,036,481 | 7/1991 | Lunsford et al. . |
| 5,204,496 | 4/1993 | Boulay et al. . |
| 5,544,008 | 8/1996 | Dimmick et al. . |
| 5,638,259 | 6/1997 | McCarthy et al. . |
| 5,650,922 | 7/1997 | Ho . |

*Primary Examiner*—Leo P. Picard
*Assistant Examiner*—Jayprakash N. Gandhi
*Attorney, Agent, or Firm*—Robert E. Bushnell, Esq.

[57] ABSTRACT

An option card-equipping device for improving electromagnetic shielding and a computer using the same includes a bracket of an option card and a shielding projection part. The bracket is connected to the option card. The shielding projection part shields electromagnetic interference between the bracket of the option card and a chassis of a main board, when the bracket of the option card is fixed on the chassis of the main board, the projection part being disposed on the chassis of the main board. By firmly connecting the bracket and the chassis of a main board and making the shielding projection part in order to prevent an empty space from occurring and thereby prevent high frequency signals from flowing out, electromagnetic interference can be eliminated.

8 Claims, 7 Drawing Sheets

OPTION CARD-EQUIPPING DEVICE FOR IMPROVING ELECTROMAGNETIC SHIELDING AND A COMPUTER USING THE SAME

CLAIM OF PRIORITY

This application makes reference to, incorporates the same herein, and claims all benefits accruing under 35 U.S.C. §119 from an application entitled an Option Caid-equipping Device for Improving Electiomagnetic Shielding and a Computer Using the Same earlier filed in the Korean Industrial Property Office on Mar. 10, 1997, and there duly assigned Ser. No. 97-7962 by that Office.

BACKGROUND OF THE INVENTION

Field of the Invention

This invention relates generally to an option card-equipping device and a computer using the same, and more particularly to an option card-equipping device for improving electromagnetic shielding and a computer using the same by making a contact between a bracket of an option card and a chassis of a main board closer, thereby eliminating an empty space between the above-identified parts.

Contemporary designs in the art are found, for example, in such exemplary references as U.S. Pat. No. 5,004,867 to Mast that discloses a Personal Computer Expansion Slot Seal and Method; U.S. Pat. No. 4,873,395 to Mast that discloses a Personal Computer Expansion Slot Seal and Method; U.S. Pat. No. 4,971,563 to Wells III discloses a Modular Backplane Assemblies for Computers; and U.S. Pat. No. 5,544,008 to Dimmick et al. shows a Computer Expansion Module Apparatus. U.S. Pat. No. 5,036,481 to Lunsford et al. discloses a Personal Computer System with Dual Purpose Expansion Slot; U.S. Pat. No. 4,744,006 to Duffield discloses an Apparatus for Expanding the Input/output Capabilities of a Personal Computer; U.S. Pat. No. 4,924,355 to Mitchell et al. discloses a Personal Computer Having expansion Card adapter Bracket; U.S. Pat. No. 5,204,496 to Boulay et al. discloses an EMI Shielding Gasket; and U.S. Pat. No. 5,650,922 to Ho discloses a Computer Interface Card Mounting Structure. U.S. Pat. No. 5,638,259 to McCarthy et al. discloses an Enclosure for Electronic Modules while U.S. Pat. No. 4,942,380 to Bradford et al. discloses a Housing Assembly Having Flexible Shield and Insulator. Contemporary designs such as that represented by Duffield'006 form a projection on an expansion card bracket and not on the chassis of the main board, while those exemplified by Mast'867 is merely use a groove as a reinforcing element so that a separate part 46 is required to achieve a reduction in electromagnetic interference.

Generally, in a desktop personal computer using one of the designs represented by these references, a connection between a bracket of an option card and a chassis of a main board is performed by connecting a chassis of a main board and a bracket of an option card by a screw. That is, such a connection method using a screw is generally used to connect a main board and an option card. When a surface of a bracket of an option card does not contact closely with a chassis of a main board, it is difficult to shield electromagnetic interference. Also, when a bracket of an option card is bent or a screw is loose and an empty space thereby occurs between a bracket of an option card and a chassis of a main board, the shielding for electromagnetic interference is reduced.

In case of a system using a low frequency clock, this is not a big problem. With a design for a system using a high frequency clock, a high frequency signal may flow out, coupled with an analog signal. Generally, the connection elements are used to increase a contact area between a chassis of a main board and a bracket of an option card. This is not perfect however.

SUMMARY OF THE INVENTION

It is, therefore, an object of the present invention to provide a chassis for electrical equipment with one or more expansion card brackets formed on the main, or motherboard.

It is another object to provide a chassis for electrical equipment exhibiting an enhanced degree of reduction in electromagnetic interference.

It is still yet another object to provide an option card-equipping device for improving electromagnetic shielding and a computer using the same. That is, even though an empty space occurs between a bracket of an option card and a chassis of a main board, this device can shield electromagnetic interference by forming a shielding part projected on both sides of a connection part of a chassis of the main board where a bracket of an option card contacts.

To achieve the above-identified object, this invention comprises a bracket of an option card and a shielding projection part. The bracket is connected to the option card. The shielding projection part shields electromagnetic interference between the bracket of the option card and a chassis of a main board, when the bracket of the option card is fixed on a chassis of the main board.

To further achieve the above-identified object, in a computer which the bracket of the option card is fixed on a chassis of a main board, the shielding projection part, formed on a chassis of a main board, shields electromagnetic interference between the bracket of the option card and a chassis of a main board, when the bracket of the option card is fixed on a chassis of a main board.

BRIEF DESCRIPTION OF THE DRAWINGS

A more complete appreciation of the invention, and many of the attendant advantages thereof, will be readily apparent as the same becomes better understood by reference to the following detailed description when considered in conjunction with the accompanying drawings in which like reference symbols indicate the same or similar components, wherein.

DETAILED DESCRIPTION OF PREFERRED EMBODIMENTS

The present invention now will be described more fully hereinafter with reference to the accompanying drawings, in which the preferred embodiments of the invention are shown. This invention may, however, be embodied in many different forms and should not be construed as limited to the embodiment set forth herein. Rather, the embodiments are provided so that this disclosure will be thorough and complete, and will fully convey the scope of the invention to those skilled in the art.

Figure 9:
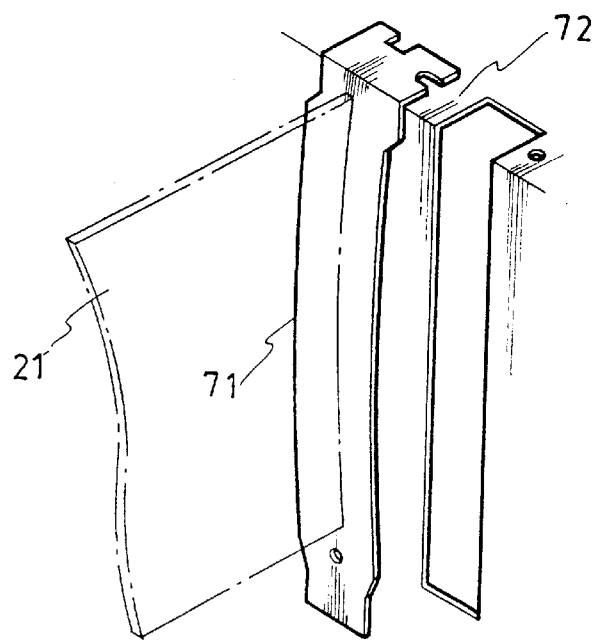
FIG. 9 is an outward view illustrating a connection part between an earlier bent bracket of an option card and a chassis of a main board according to an earlier arrangement.
Figure 10:
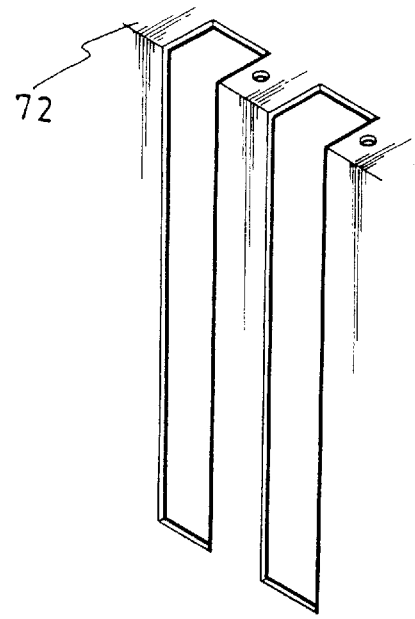
FIG. 10 is an outward view illustrating an earlier chassis of a main board.
Figure 11:
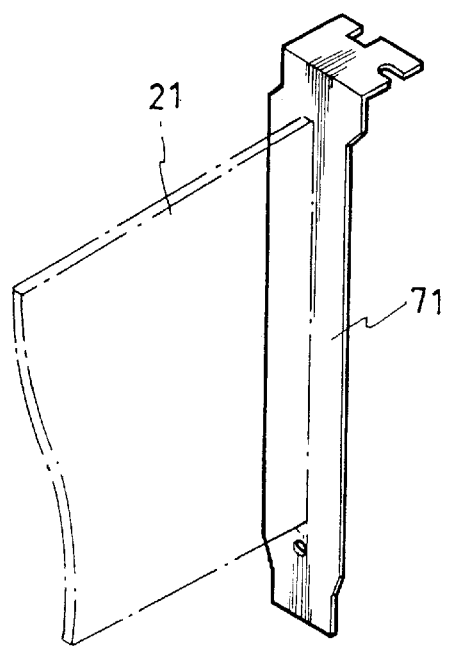
FIG. 11 is an outward view illustrating an earlier bracket of an option card.
Figure 12:
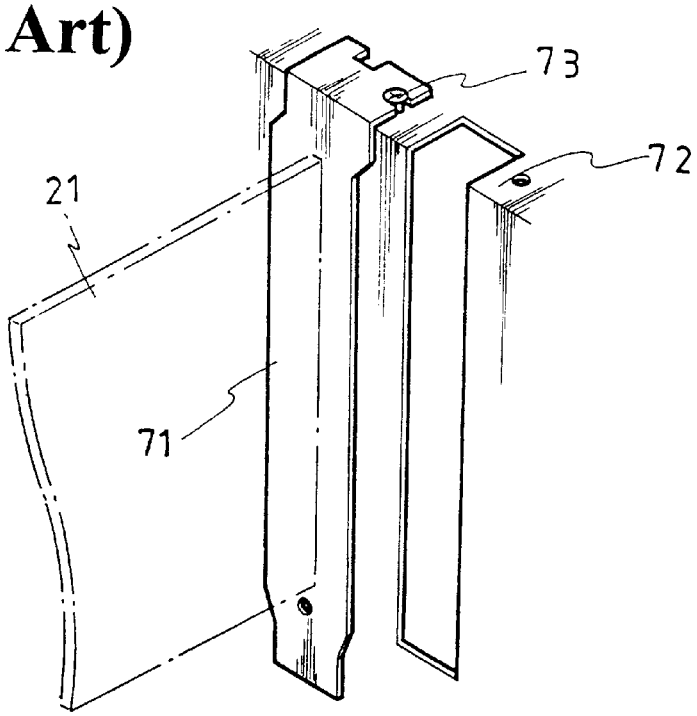
FIG. 12 is an outward view illustrating a connection part between an earlier bracket of an option card and a chassis of a main board.
Figure 13:
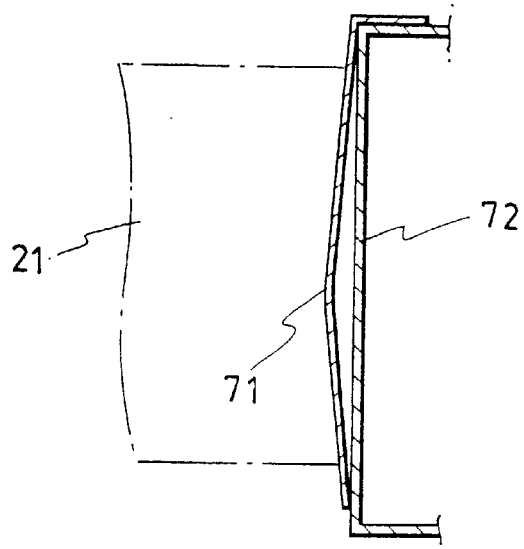
FIG. 13 is a side view illustrating a connection part between an earlier bent bracket of an option card and a chassis of a main board.

FIG. 12 illustrates a connection between a chassis of a main board of FIG. 10 and a bracket of an option card of FIG. 11. As shown in FIGS. 9 and 13 however, when a surface of a bracket of an option card does not contact closely with the chassis of the main board, it is difficult to shield electromagnetic interference. Thus, FIGS. 9–13 correspond to the earlier arrangement discussed above in the foregoing Description of the Related Art.

Figure 1:
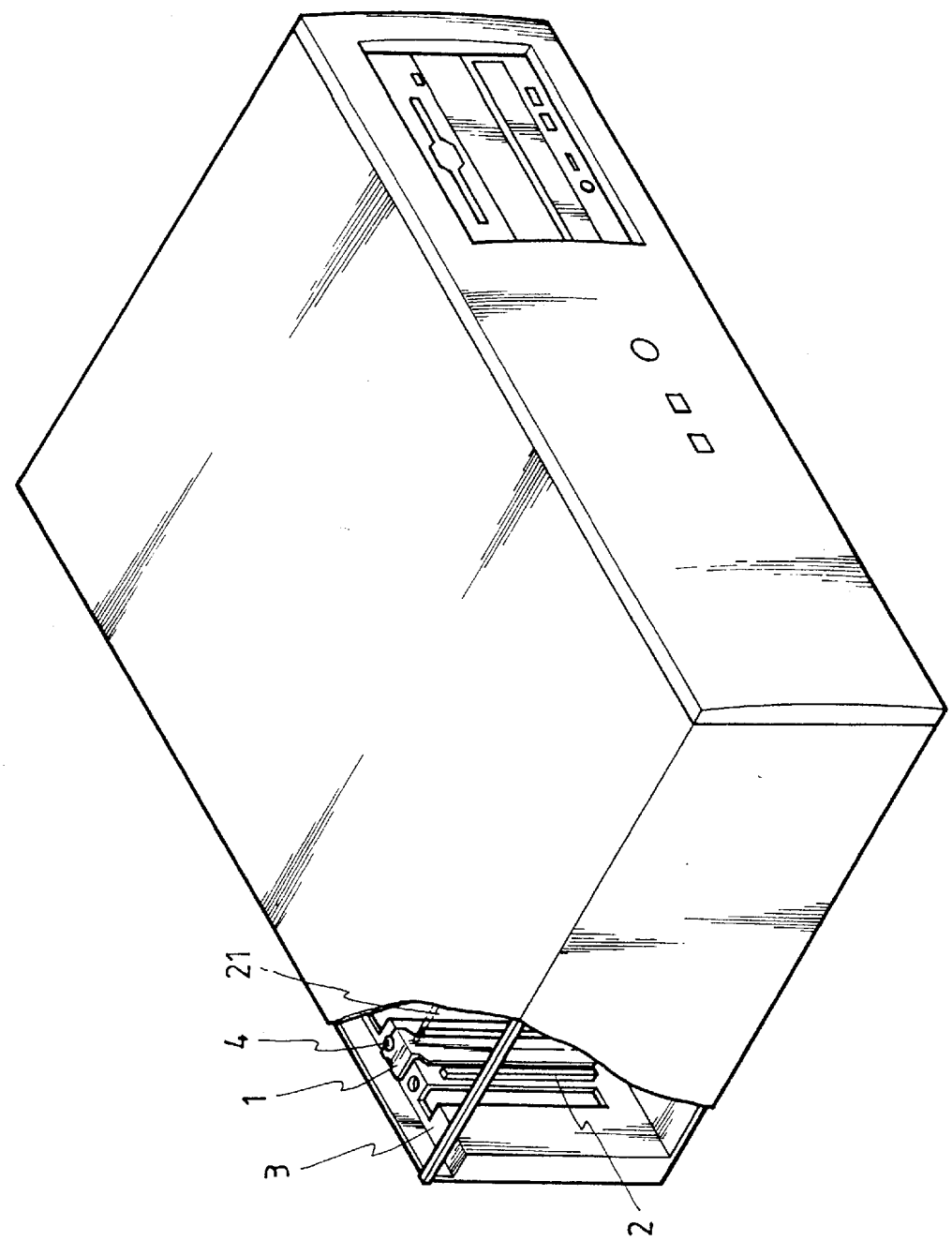
FIG. 1 is a perspective view illustrating an option card-equipping device for improving electromagnetic shielding and a computer using the same according to an embodiment of the present invention.
Figure 2:
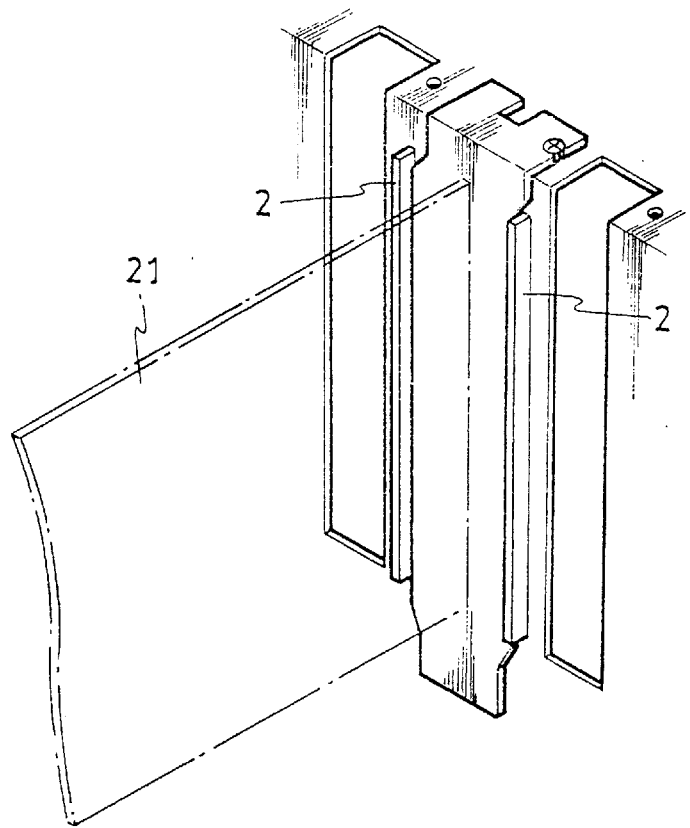
FIG. 2 is a view illustrating when a bracket of an option card is fixed into a chassis of a main board according to an embodiment of the present invention.

As shown in FIG. 1, an option card-equipping device for improving electromagnetic shielding and a computer using the same has a bracket 1 of an option card 21, a chassis 3 of a main board and a screw 4. The bracket 1 is attached to the option card 21. The chassis 3 of a main board has a shielding projection part 2 which plays a role in fixing the bracket I exactly on the chassis 3 of a main board and can shield electromagnetic interference even though the bracket 1 is bent. The screw 4 connects the chassis 3 of a main board and the bracket 1.

The operation of an option card-equipping device for improving electromagnetic shielding and a computer using the same according to the embodiments of the prevent invention is as follows. Since the connection part of the option card 21 is a standard structure, in which many companies have established, it is not feasible to make major modifications to the option card 21. Accordingly, the application of the present invention will enable electromagnetic interference to be shielded without making major modifications to the option card 21.

Figure 3:
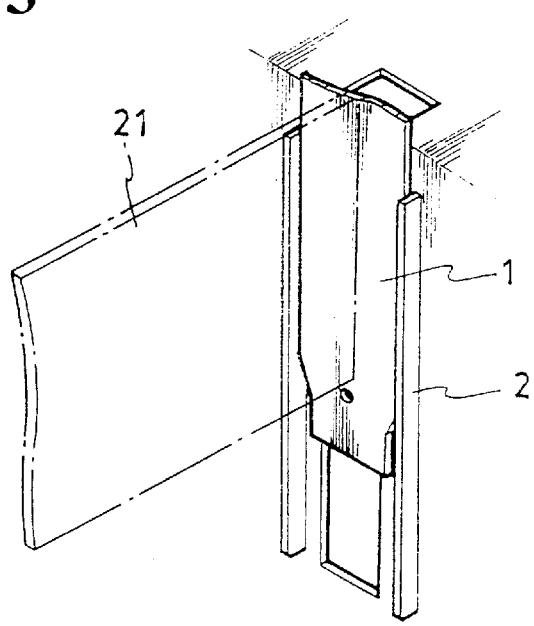
FIG. 3 is a view illustrating a state before a bracket of an option card is fixed into a chassis of a main board according to an embodiment of the present invention.
Figure 5:
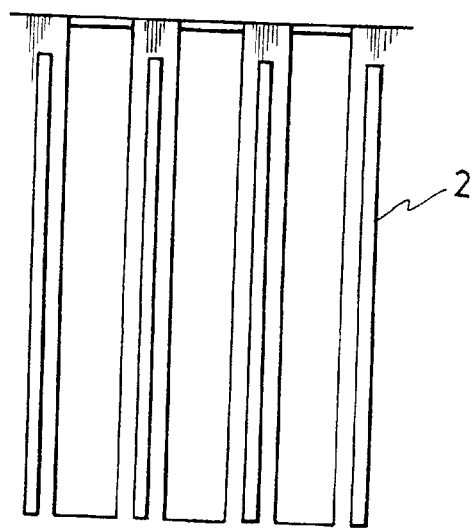
FIG. 5 is a front view illustrating a state before a bracket of an option card is fixed into a chassis of a main board according to an embodiment of the present invention.
Figure 7:
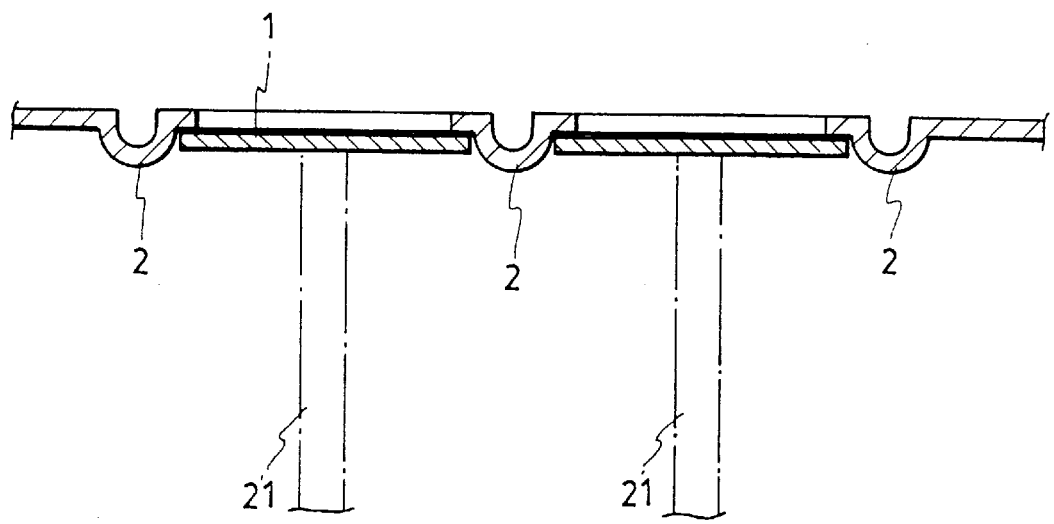
FIG. 7 is a cross-sectional top view of a chassis of a main board according to a further embodiment of the present invention.
Figure 8:
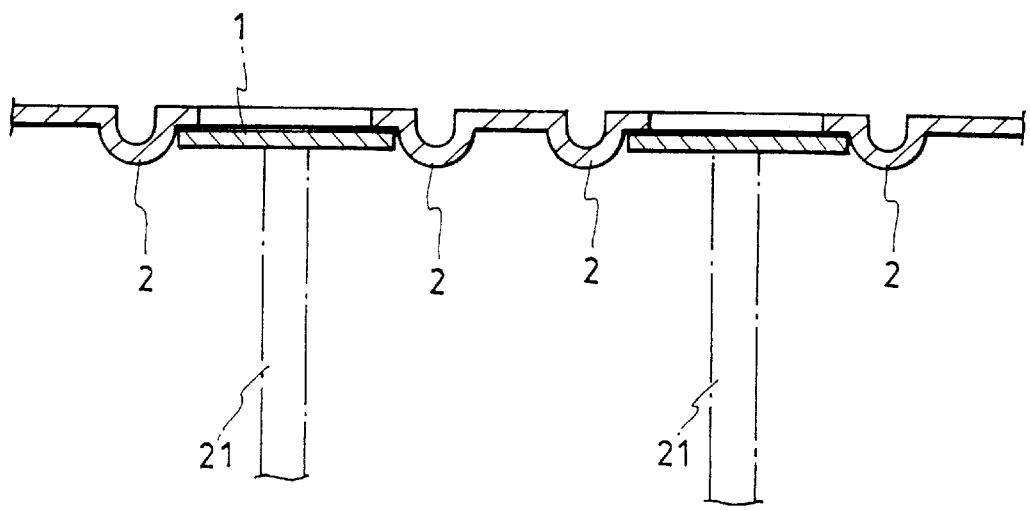
FIG. 8 is a cross-sectional top view of a chassis of a main board according to a further embodiment of the present invention.

That is, as shown in FIGS. 3 and 5, an area where the bracket 1 of the option card 21 is contacted on the chassis 3 of a main board is indented, whereas both sides of the caved-in area are projected. As a result, the bracket 1 is firmly fixed on the chassis 3 of a main board. In particular, there should be no empty space between the bracket 1 and the chassis 3, thereby effectively preventing the outflow of electromagnetic waves. As shown in FIG. 7, the shielding projection part 2 can be embossed on the chassis 3 of a main board. And, as shown FIG. 8, the shielding projection part 2 can be doubly embossed on the chassis 3 of a main board and be also formed on both ends of the chassis 3 of a main board. Generally, the interval between the contact area of one option card and that of another option card is about 2 or 3 mm. The projected areas are formed by exploiting the above-identified areas.

Figure 6:
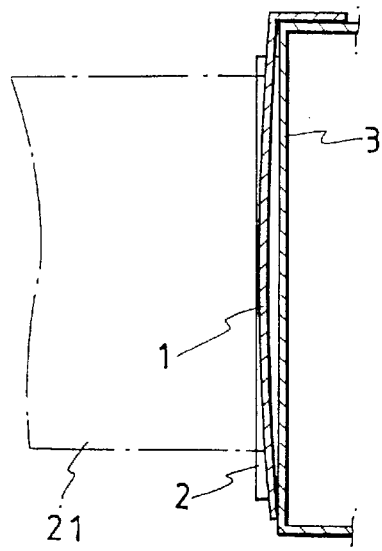
FIG. 6 is a cross-sectional side view illustrating a state after a bracket of an option card is fixed into a chassis of a main board according to an embodiment of the present invention.

FIG. 1 represents the structure of the present invention. If the shielding projection part 2 is formed on the chassis 3 of a main board and the bracket 1 is firmly fixed on the chassis 3 of a main board by the screw 4, as shown in FIG. 6, the projected shielding projection part 2, even though the bracket 1 is bent, can prevent electromagnetic waves from flowing outward. Also, the shielding projection part 2 plays a role as a guide to fix the bracket 1 on the indented area of the chassis 3 of a main board firmly. That is, the shielding projection part 2, which is formed between the indented areas of the chassis 3 of a main board, firmly connects the bracket 1 and the chassis 3 of a main board together.

Figure 4:
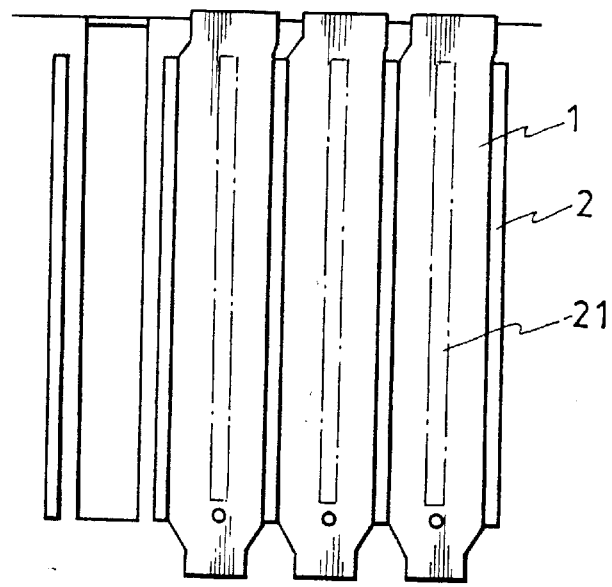
FIG. 4 is a front view illustrating a state when a bracket of an option card is fixed into a chassis of a main board according to an embodiment of the present invention.

In addition, FIGS. 3 and 4 represent a shape that the bracket 1 is inserted into the chassis 3 of a main board. Even though the bracket 1 of the option card 21 is bent, in order to shield an outflow of a high frequency signal, the present invention can prevent an empty space from occurring between the bracket 1 and the chassis 3 of a main board by making the projected shielding projection part 2. As referred in the foregoing description, by firmly connecting the bracket 1 and the chassis 3 of a main board and making the shielding projection part 2 in order that an empty space does not occur and a high frequency signal does not flow out, the present invention can shield electro magnetic interference.

Having described and illustrated the principles of the invention in the preferred embodiments thereof, it should be apparent that the invention can be modified in arrangement and detail without departing from such principles. It may be noted that the foregoing embodiments advantageously improves those earlier designs such as are represented by Duffield'006 because embodiments of the present invention use a conductible pressed metal and is a bending type and forms a projection part on the chassis of a main board, unlike the contemporary practice represented by Duffield'006 where the projection formed on an expansion card bracket and not on the chassis of the main board. Moreover, the second embodiment of the present invention provides a projection part different from the groove 33 of Mast'867, which is merely a reinforcing element, the Mast'867 consequently, such contemporary designs require a separate part 46 to achieve a reduction in electromagnetic interference. We claim all modifications and variations coming within the spirit and scope of the following claims.

What is claimed:

1. A computer including an option card-equipping device for improving electromagnetic shielding, with a bracket of an option card fixed on a chassis, comprises a shielding projection part for shielding electromagnetic interference between the bracket of the option card and the chassis, when the bracket of the option card is fixed on the chassis, the projection part being disposed on the chassis and protruding towards the bracket.

2. A computer according to claim 1, the shielding projection part being embossed on the chassis.

3. A computer according to claim 1, the shielding projection part being of a bending type and of the same material as the chassis.

4. A computer according to claim 1, the edges of the bracket are disposed between the shielding projection part and an adjacent projection part.

5. An option card-equipping device for improving electromagnetic shielding comprising:
- a bracket which is connected to an option card; and
- a shielding projection part for shielding electromagnetic interference between the bracket of the option card and a chassis, when the bracket of the option card is fixed on the chassis of a main board, the projection part being disposed on the chassis and protruding towards the bracket.

6. An option card-equipping device for improving electromagnetic shielding according to claim 1, the shielding projection part being embossed on the chassis.

7. An option card-equipping device for improving electromagnetic shielding according to claim 1, the shielding projection part being of a bending type and of the same material as the chassis.

8. An option card-equipping device for improving electromagnetic shielding according to claim 1, the edges of the bracket being disposed between the shielding projection part and an adjacent projection part.

* * * * *